United States Patent [19]

Kumamoto et al.

[11] Patent Number: 5,418,896
[45] Date of Patent: May 23, 1995

[54] SKEW PROCESSING CIRCUIT AND METHOD OF CALCULATING A PRESET VALUE FOR THE SAME

[75] Inventors: Hidechika Kumamoto, Sakai; Haruo Yamamoto, Sennan; Masaya Fujimoto, Kobe; Tsukasa Matsushita, Daito, all of Japan

[73] Assignee: Mita Industrial Co., Ltd., Osaka, Japan

[21] Appl. No.: 669,628

[22] Filed: Mar. 14, 1991

[30] Foreign Application Priority Data

Mar. 20, 1990 [JP] Japan ..................... 2-70299
Mar. 20, 1990 [JP] Japan ..................... 2-70300

[51] Int. Cl.$^6$ ............................................ G06T 11/00
[52] U.S. Cl. ....................... 395/133; 395/136; 395/148
[58] Field of Search ..................... 395/133–139, 395/141, 125, 127, 145, 147, 148; 382/44; 348/571

[56] References Cited

U.S. PATENT DOCUMENTS 4,788,599 11/1988 Sugishima .................. 382/44 X
5,187,753  2/1993 Bloomberg et al. ......... 395/137 X

FOREIGN PATENT DOCUMENTS 2136244  9/1984 United Kingdom .......... H04N 1/26
2189964 11/1987 United Kingdom ......... H04N 1/387

*Primary Examiner*—Almis Jankus
*Attorney, Agent, or Firm*—Beveridge, DeGrandi, Weilacher & Young

[57] ABSTRACT

A skew processing circuit 33 includes two line buffers, a skew processing type line buffer 331 and an original type line buffer 332, and a write/read control circuit 333 for controlling the two line buffers. The write/read control circuit 333 is a control circuit for writing a given image data in the line buffers 331, 332 in single lines and selectively reading the data written in the two line buffers 331, 332. When an image data is written in the original type line buffer 332, addressed are sequentially written from the head address 0. On the other hand, when the image data is written in the skew processing type line buffer 331, a write start address RH0 is determined in correspondence with a skew angle, and the write start address RH0 is shifted in each line to discard the head portion of the image data by specified dots (specified addresses). Thus, by controlling the writing of data in the two line buffers 331, 332 and reading data from them, an image in an arbitrary area can be processed into the skew with an arbitrary angle.

4 Claims, 13 Drawing Sheets

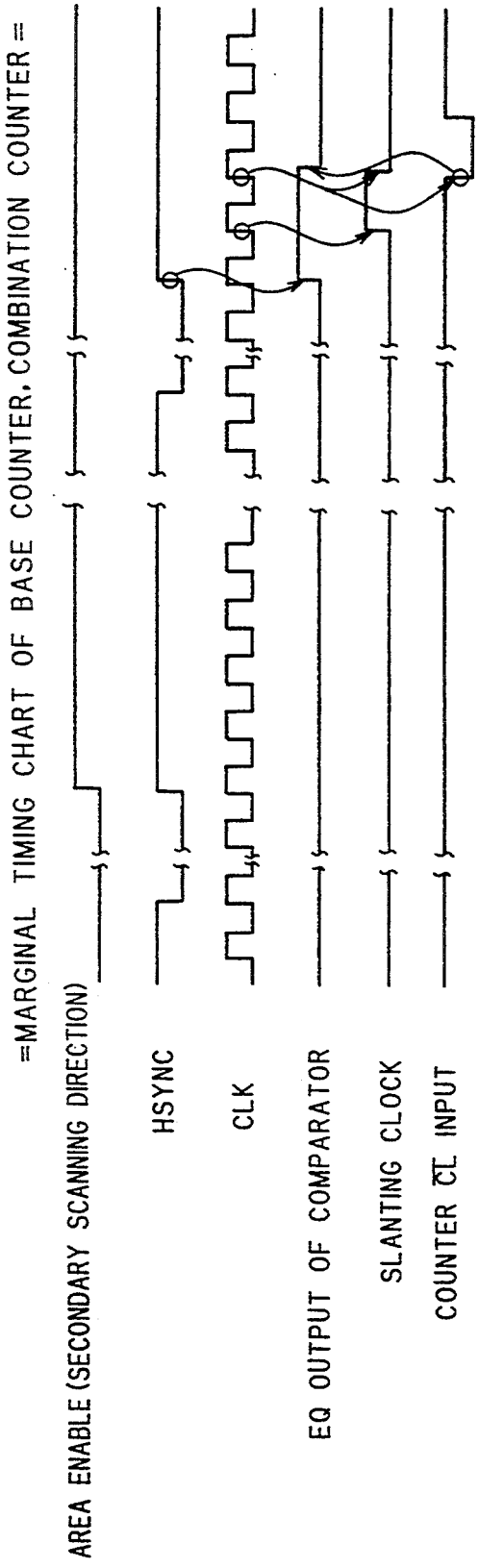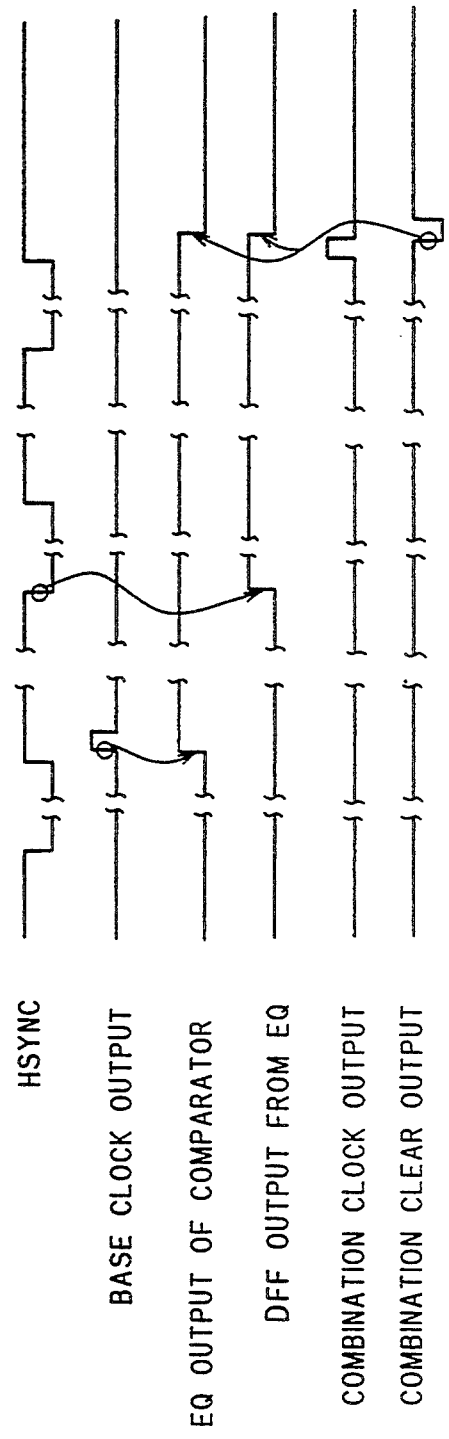

SKEW PROCESSING CIRCUIT AND METHOD OF CALCULATING A PRESET VALUE FOR THE SAME

BACKGROUND OF THE INVENTION

1. Field of the Invention

The present invention relates to a skew processing circuit for a digital image formation device.

2. Description of the Prior Art

On a digital copying machine as an example of a digital image formation device, that which has a skew processing function is known.

Skew processing in a conventional digital copying machine is performed to the whole image of an original sheet read out. More specifically, the whole original image rectangular in shape is processed into the skew to make a parallelogram image.

Thus, in such a skew processing in the conventional digital copying machine, it is impossible to process a specified area of the original image alone into the skew.

In general, however, upon copying an original image, there are more cases where not the whole original image but simply a part of the original image should be processed into the skew. For example, when an original contains a document, there is a case where the head line of the document alone must be processed into the skew.

Additionally, with a skew processing in the conventional digital copying machine, it is difficult to freely set an inclination angle of an image, namely, a skew processing angle, in a wide range of an angle because the resultant skew image may be distorted.

SUMMARY OF THE INVENTION

Accordingly, it is a general object of the present invention to provide a skew processing circuit capable of performing a partial skew processing to an original image which a conventional skew processing circuit cannot accomplish.

It is another object of the present invention to provide a method of calculating a preset value of a counting means for a skew processing circuit in which a skew-processed image without distortion in a wide range of an angle can be obtained.

According to the present invention, based upon a signal specifying an area to be processed into the skew, a provided original image is selectively processed into the skew, and simply a desired area of the image data can be transformed into skew image data.

Furthermore, according to the present invention, an area void of data is produced as a result of a skew processing of an image data by a skew processing means; the data void area is masked so that an original image identical with a skew image might not be outputted in the data void area. Thus, the resultant output is skew image data existing in original image data in a good condition.

Moreover, according to the present invention, in the case where an area to be processed into the skew is specified, when, as a result of a skew processing of image data in that area, the image data is slanted at the head or the tail of the area partially out to the exterior of the specified area, either of an original image data or a skew image data in that part can take precedence over each other.

Further, according to the present invention, specifying an initial point of a skew image makes it possible to arbitrarily set an effective area of the skew processing.

Also, according to the present invention, an amount of shifting a processing address is determined by a base counting means, a base clear counting means and a combination counting means; therefore, image data is shifted by the optimum address shift amount depending upon a preset angle, and a good skew image can be obtained in a wide range of an angle.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A and 7B are timing charts expressing the operation of the address shift clock generating circuit;

DESCRIPTION OF THE PREFERRED EMBODIMENTS

Now, with reference to the accompanying drawings, embodiments according to the present invention will be described in detail.

Figure 1:
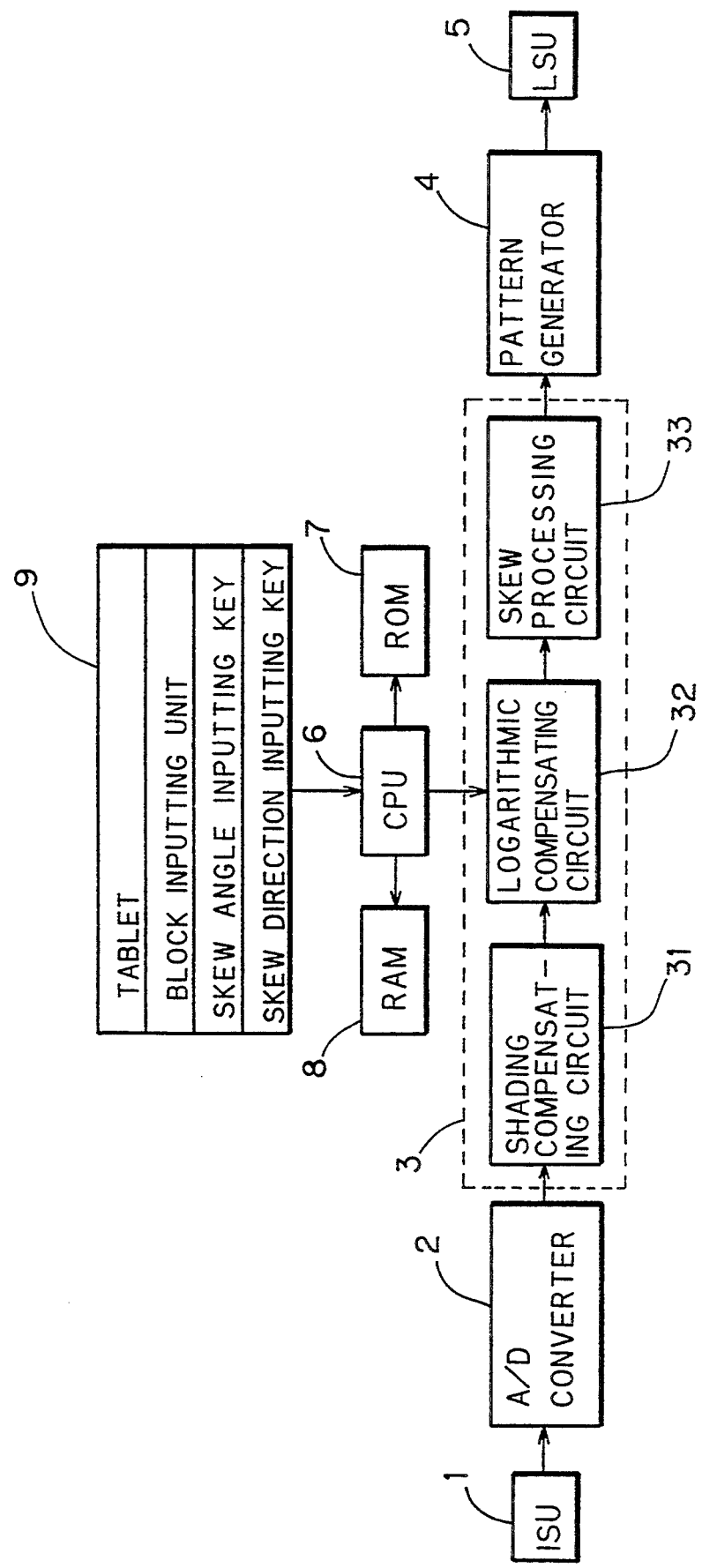
FIG. 1 is a block diagram showing a system architecture of a digital copying machine of an embodiment according to present invention.

FIG. 1 is a block diagram showing an overall system architecture of a digital copying machine having a skew processing circuit of an embodiment according to the present invention.

First, referring to FIG. 1, the overall architecture of the digital copying machine will be described. An original image (not shown) is read by an image scan unit 1; original image data read out is converted by an A/D converter 2 into digital data, and it is applied to an image processing circuit 3. The image processing circuit 3 includes a shading compensating circuit 31, a logarithmic compensating circuit 32 and a skew processing circuit 33 characterizing this embodiment. Image data processed by the image processing circuit 3 is applied to a pattern generator 4; an output of the pattern generator 4 causes a laser scan unit 5 to operate, and an image is reproduced. The image processing circuit 3 is placed under the control of a CPU 6 which controls the whole digital copying machine. Connected to the CPU 6 are a ROM 7 having its operation program stored and a RAM 8 serving as a storing device in and from which data is freely written and read out.

Further, connected to the CPU 6 is an area specifying device, such as a tablet 9 and the like. In this embodiment, the tablet 9 is utilized to make an input specification on an area to be processed into the skew, an angle of the skew (an inclination angle of an image) and a direction of the skew (whether the image is slanted to the left (the positive direction) or to the right (the negative direction)); simply an image data of the area specified by an input is processed into the skew by the skew processing circuit 33 at a specified angle in a specified direction.

Figure 2A:
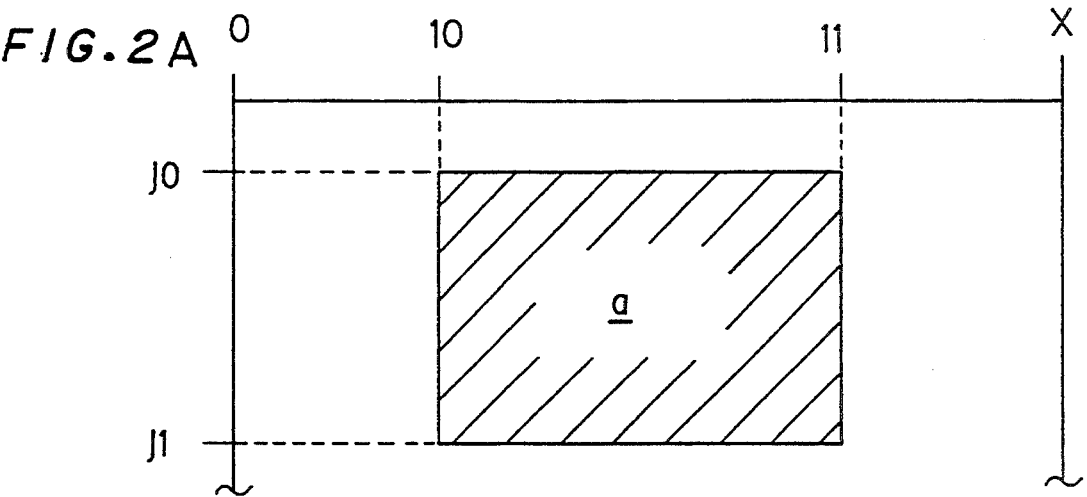
FIGS. 2A, 2B and 2C are diagrams for explaining procedures of a skew processing.
Figure 2B:
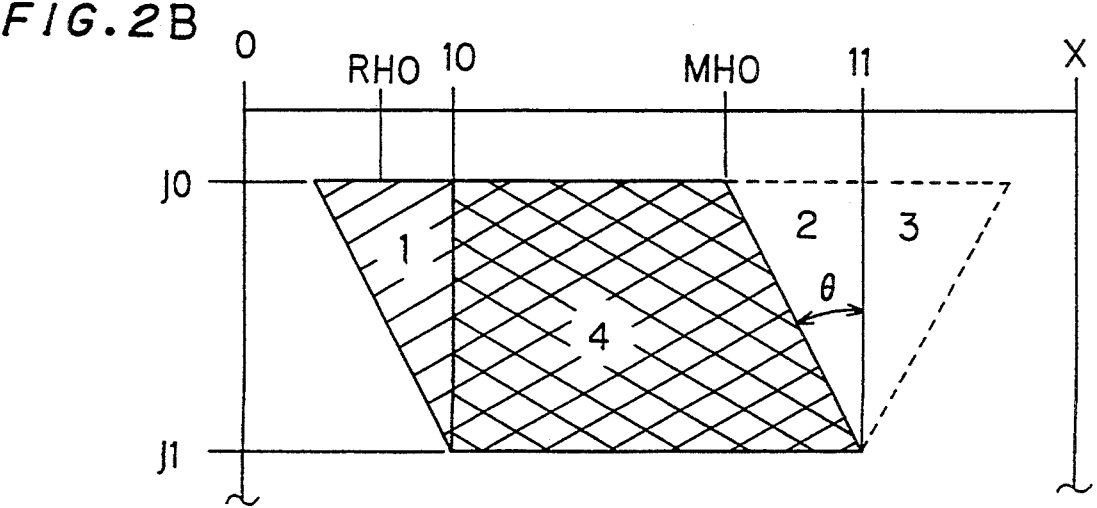
Figure 2C:
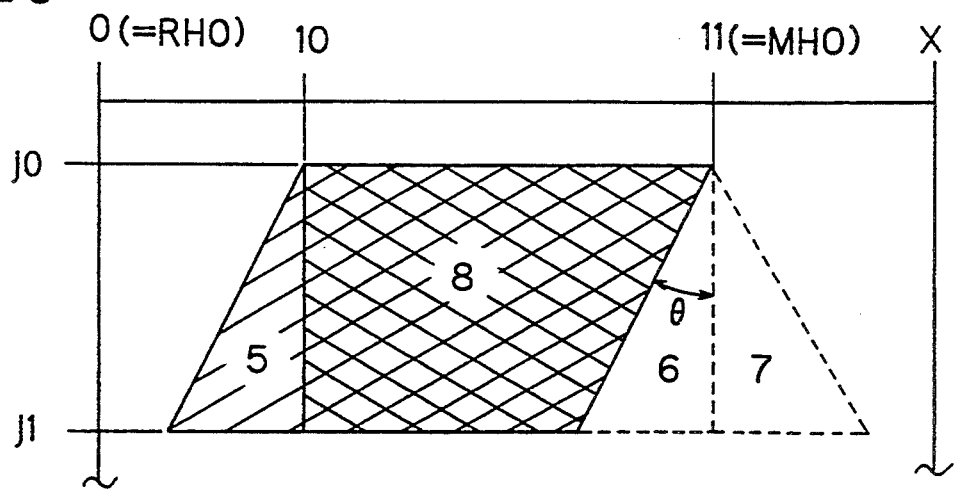

FIGS. 2A, 2B and 2C are diagrams for explaining procedures of the skew processing in this embodiment. In this embodiment, the skew processing means a data processing in which a rectangular area a with hatching in an original image shown in FIG. 2A slanted, for example, to the left (in the positive direction) at a desired angle &H to obtain a copy containing a skew image as shown in FIG. 2B; otherwise, it means a data processing in which the rectangular area a with hatching in the original image shown in FIG. 2A slanted, for example, to the right (in the negative direction) at a desired angle &H to obtain a copy containing a skew image as shown in FIG. 2C.

In FIG. 2B, an area 1 with hatching has the skew image and the original image overlapping with each other; so in this embodiment, giving precedence to the original image, the processing is executed without outputting the skew image. In an area 2, a skew image identical with the original image appearing in an area 3 appears; therefore, an output is masked so that a blank image (or a solid image) appears. As a result, a copy having an area 4 with check slanted in the positive direction into the skew image is obtained.

When the skew processing in the negative direction is performed, as shown in FIG. 2C, an area 5 with hatching has the skew image and the original image overlapping with each other; the original image takes precedence. In an area 6, a skew image identical with the original image appearing in an area 7 appears; therefore, an output is masked so that a blank image appears. As a result, a copy having an area 8 with check slanted in the positive direction into the skew image in FIG. 2C is obtained.

Figure 3:
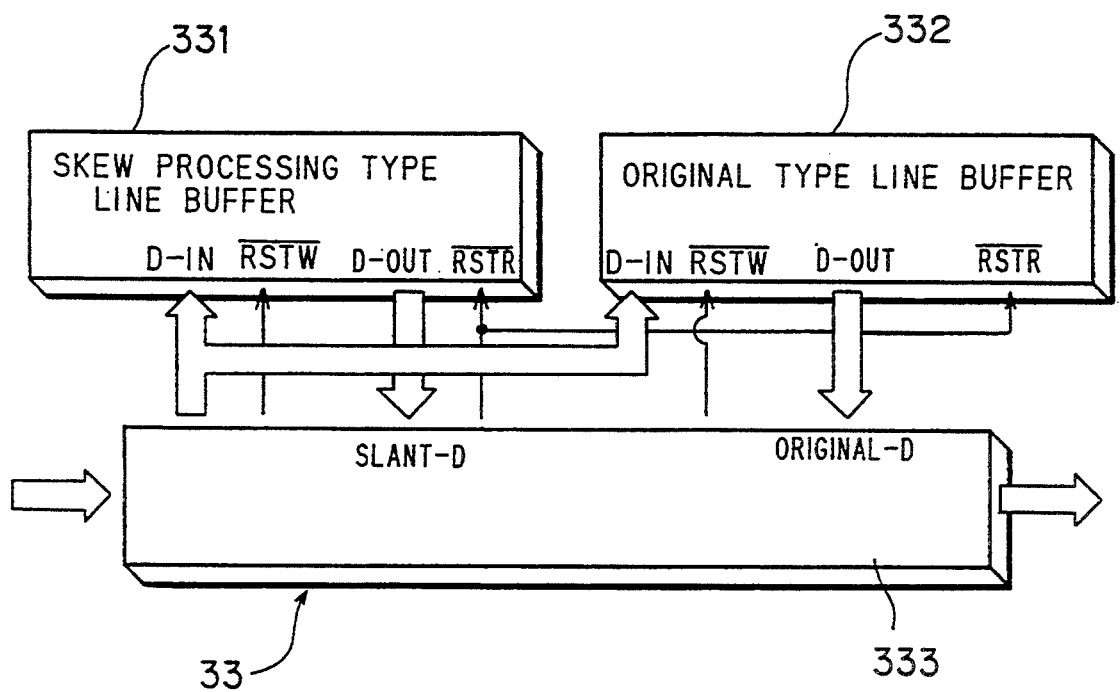
FIG. 3 is a block diagram showing an architecture of a skew processing circuit characterizing the embodiment.

FIG. 3 is a block diagram for explaining the skew processing circuit in this embodiment. The skew processing circuit 33 in this embodiment includes two line buffers, a skew processing type line buffer 331 and an original type line buffer 332, and a write/read control circuit 333 for controlling the two line buffers. The write/read control circuit 333 is a control circuit which writes a given image data in single lines in the two line buffers 331, 332 and selectively reads data written in the two line buffers 331, 332. When image data is written in the original type line buffer 332, it is sequentially written from the head address 0. On the other hand, when image data is written in the skew processing type line buffer 331, a write start address RH0 is determined in correspondence with a skew angle; the write start address RH0 is shifted in each line, and the head portion of the image data is discarded by specified dots (by a specified address).

For example, in order to obtain a copy of FIG. 2B, the write start address RH0 to the skew processing type line buffer 331 is expressed as follows:

$$RH0 = (j1 - j0) \times \tan\theta$$

When an image data in a line j0 is written in the skew processing type line buffer 331, the head of the data is discarded and written from the address RH0. Further, the write start address RH0 is, as explained later, sequentially shifted in accordance with a preset value of a counter which is determined in correspondence with the skew angle $\theta$. Moreover, in the case of FIG. 2B, in order to make the masking area 2, a mask start address MH0 as follows:

$$MH0 = i1 - RH0$$

is determined.

Furthermore, to obtain a copy of FIG. 2C, the write start address RH0 is expressed as follows:

$$RH0 = 0$$

and the mask start address is expressed as follows:

$$MH0 = i1$$

When the image data is read out, the write/read control circuit 333 reads an image data from the skew processing type line buffer 331 for the specified area processed into the skew (the rectangular area having apexes (i0, j0) (i1, j0) (i0, j1) (i1, j1)), but reads an image data from the original type line buffer 332 for the remaining area. The reading out of the image data will be explained in detail later.

Figure 4:
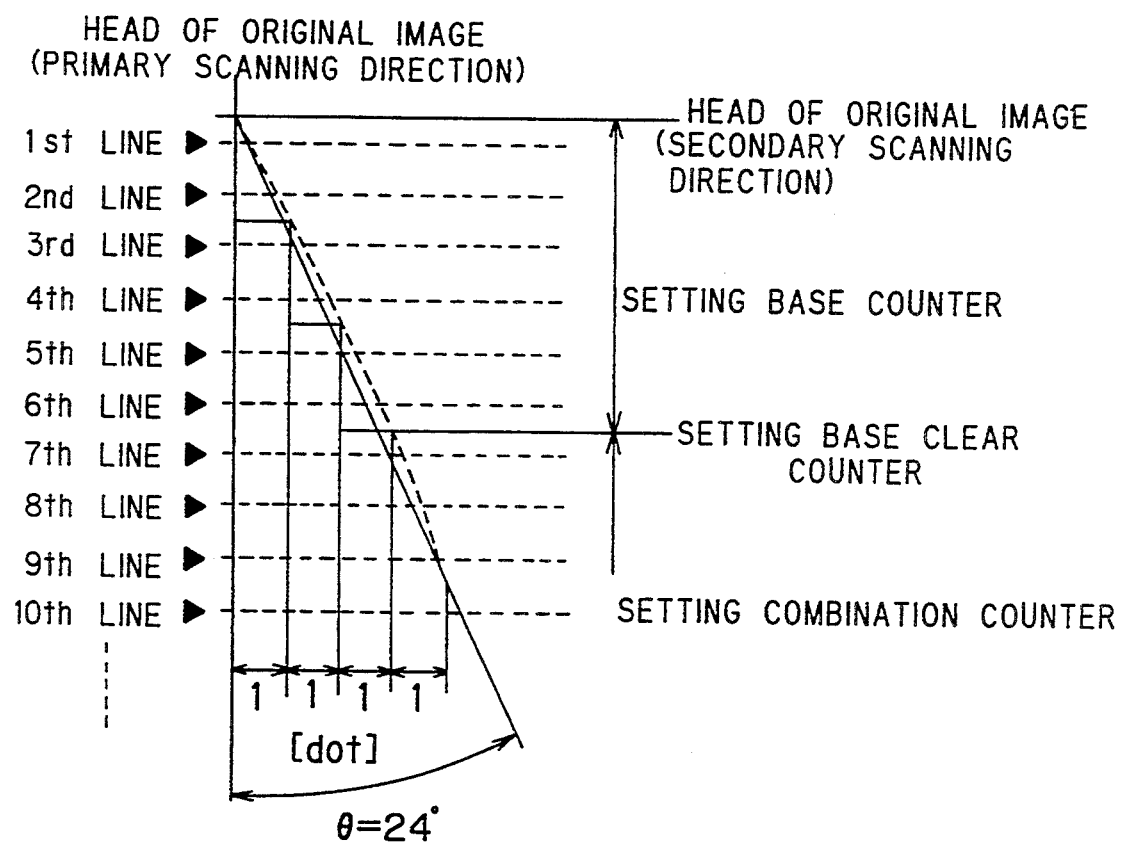
FIG. 4 is a diagram for explaining a line start address shift control for the skew processing.

FIG. 4 is a diagram showing an example of shifting the write start address RH0 in the case of writing an image data in the skew processing type line buffer 331. FIG. 4 especially shows a case where the inclination angle $\theta = 24°$. In this case, the data is written without shifting the write start address RH0 in the first and second lines; the data is written with the write start address RH0 shifted by a single dot (with the head of the image data discarded by another single dot) in the third and fourth lines; the data is written with the write start address RH0 shifted by two dots in the fifth and sixth lines; the data is written with the write start address RH0 shifted by three dots in the seventh, eighth and ninth lines; in the tenth line and after, the data is written with the write start address RH0 sequentially shifted by repetition of the operation beginning with the first line.

Specifically, each time the data in a couple of lines is written, the write start address RH0 is shifted by a single dot; after repeating the operation three times, a sequence of steps of writing the data in three lines and shifting the write start address RH0 by a single dot is repeated. In this way, the resultant image slanted at the skew angle $\theta = 22°$ is obtained with little distortion.

The amounts by which the write start address RH0 is shifted are preset by three counters; that is, n = 2 by a base counter, x=3 by a base clear counter, and m=3 by a combination counter, respectively.

Tables 1 and 2 below show counter preset values for shifting the write start address RH0 for the skew processing, respective values for each skew angle.

TABLE 1

| Skew Angle [°] | Preset Value n of Base Counter | Present Value x of Clear Counter | Preset Value m of Combination Counter |
|---|---|---|---|
| 1 | 57 | 1 | 57 |
| 2 | 28 | 1 | 28 |
| 3 | 19 | 1 | 19 |
| 4 | 14 | 1 | 14 |
| 5 | 11 | 1 | 12 |
| 6 | 9 | 1 | 10 |
| 7 | 8 | 3 | 9 |
| 8 | 7 | 4 | 8 |
| 9 | 6 | 2 | 7 |
| 10 | 6 | 2 | 5 |
| 11 | 5 | 5 | 6 |
| 12 | 5 | 2 | 4 |
| 13 | 4 | 2 | 5 |
| 14 | 4 | 1 | 4 |
| 15 | 4 | 3 | 3 |
| 16 | 3 | 1 | 4 |
| 17 | 3 | 3 | 4 |
| 18 | 3 | 10 | 4 |
| 19 | 3 | 8 | 2 |
| 20 | 3 | 3 | 2 |
| 21 | 3 | 2 | 2 |
| 22 | 2 | 1 | 3 |

TABLE 2

| | | | |
|---|---|---|---|
| 23 | 2 | 2 | 3 |
| 24 | 2 | 3 | 3 |
| 25 | 2 | 6 | 3 |
| 26 | 2 | 16 | 3 |
| 27 | 2 | 21 | 1 |
| 28 | 2 | 7 | 1 |
| 29 | 2 | 4 | 1 |
| 30 | 2 | 3 | 1 |
| 31 | 2 | 2 | 1 |
| 32 | 1 | 4 | 4 |
| 33 | 1 | 8 | 6 |
| 34 | 1 | 1 | 2 |
| 35 | 1 | 6 | 4 |
| 36 | 1 | 4 | 3 |
| 37 | 1 | 2 | 2 |
| 38 | 1 | 6 | 3 |
| 39 | 1 | 3 | 2 |
| 40 | 1 | 4 | 2 |
| 41 | 1 | 6 | 2 |
| 42 | 1 | 8 | 2 |
| 43 | 1 | 13 | 2 |
| 44 | 1 | 25 | 2 |
| 45 | 1 | 1 | 1 |

Figure 5A:
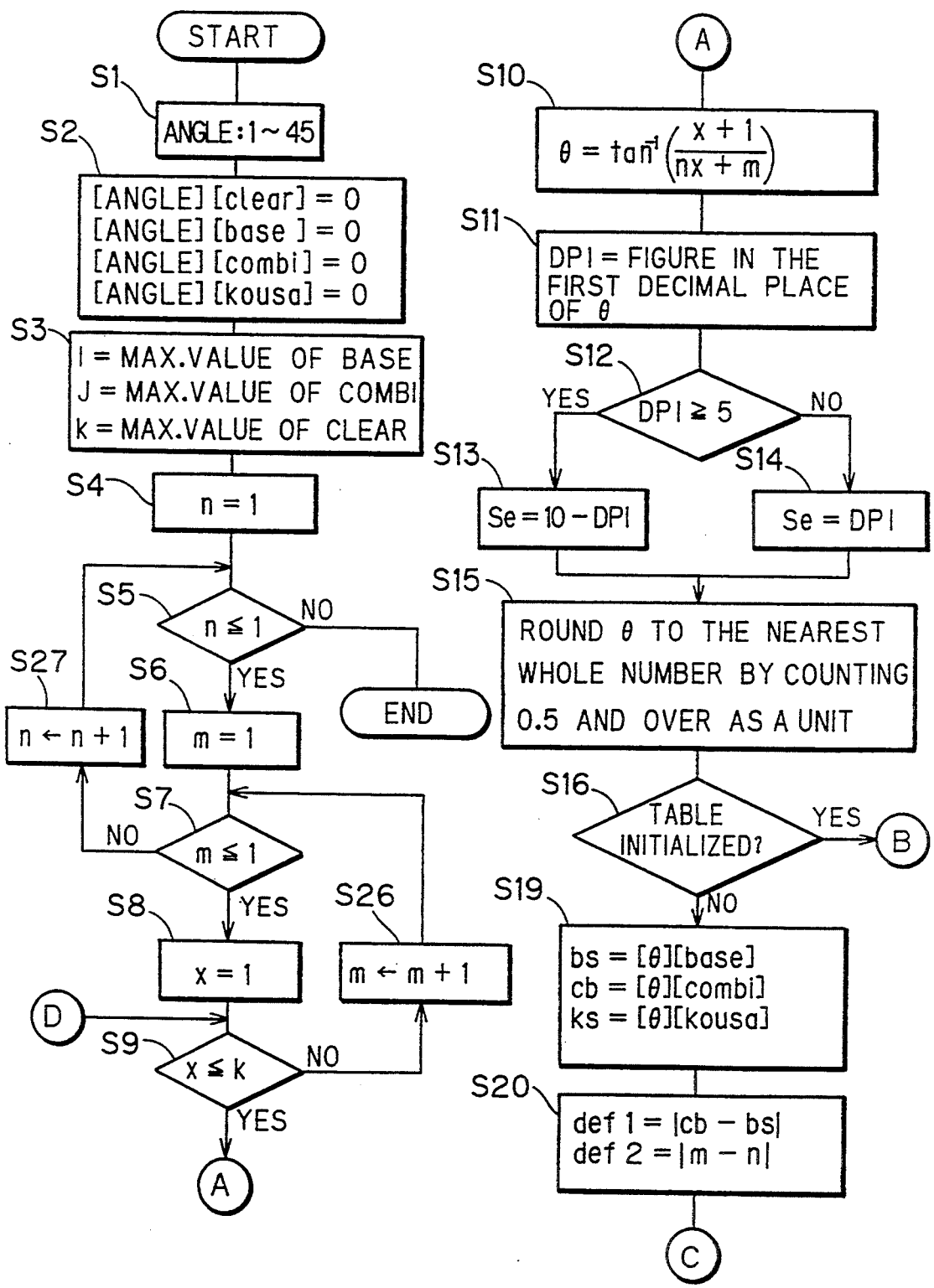
FIGS. 5A and 5B re exemplary flow charts for calculating a table preset value for a start address shift.
Figure 5B:
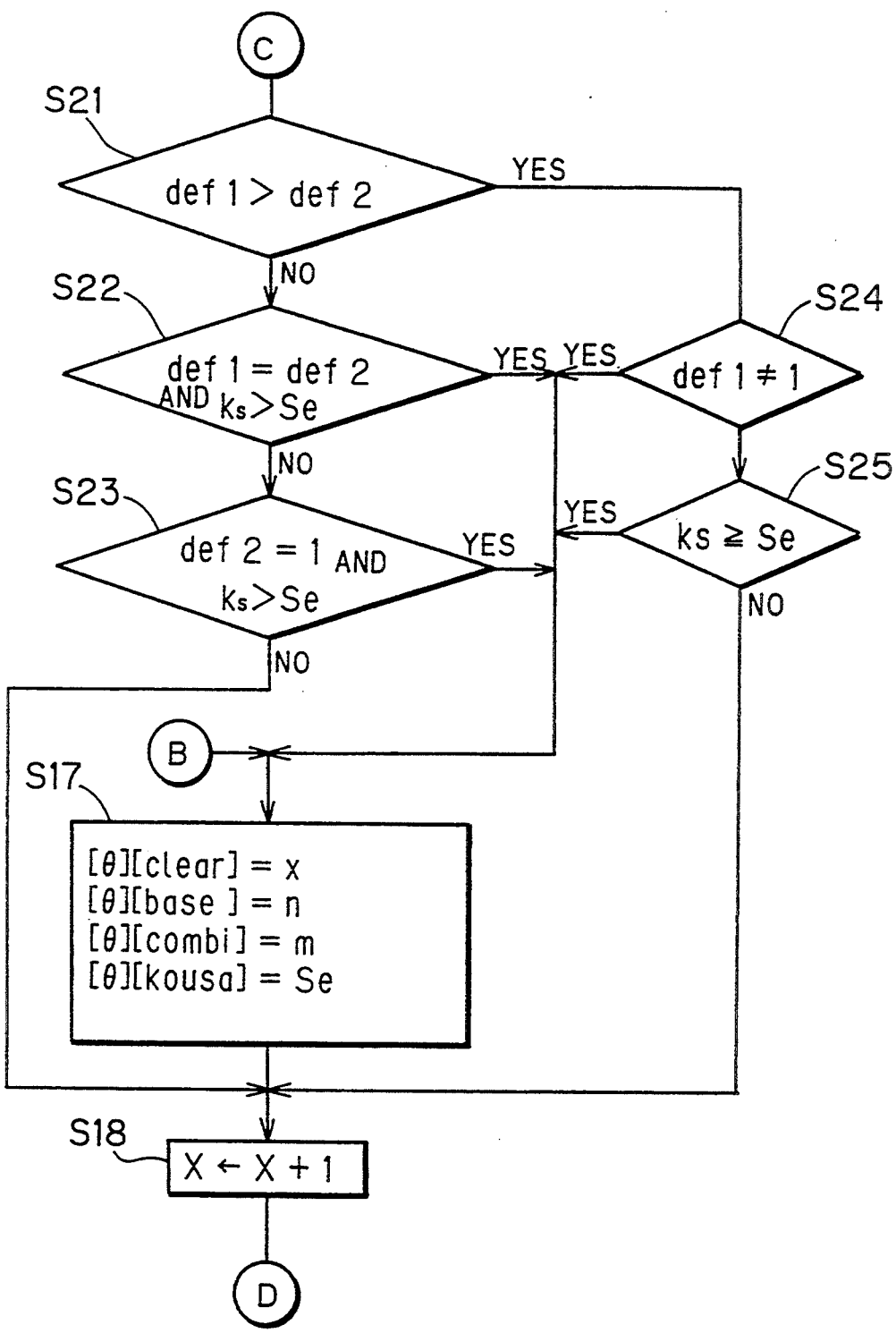

FIGS. 5A and 5B are flow chars for calculating the preset values of the counters shown in Table 1.

Then, referring to FIGS. 5A and 5B, the way of calculating the preset values n, x and m of the counters in Tables 1 and 2 will be explained. The skew angle $\theta$ is set from 1° through 45° in the count setting table (Table 1) (Step S1). Then, an initialization is carried out to clear the base count n, the clear count x, the combination count m and a tolerance count (a count value of a register for keeping the figure of the first decimal place as a result of the operation) (Step S2). Then, the preset maximum value i of the base count n, the preset maximum value j of the combination count m, and the preset maximum value k of the clear count x are specified (Step S3). The base count is set as n=1 (Step S4), and it is judged whether the count n is smaller than the preset maximum value i (Step S5). If so, the combination count is set as m=1 (Step S6). Then, the combination count m is compared with the preset maximum value j (Step S7). If m≦j, the clear count is set as x=1 (Step S8). Then, it is judged whether the clear count is equal to or under the preset maximum value k (Step S9); if x≦k, the skew angle $\theta$ (rad) is calculated according to the following formula (Step S10):

$$\theta = \tan^{-1} \frac{x+1}{nx+m}$$

In this case, since n=m=x=1 is satisfied, $\theta = \tan^{-1} 1 = 45°$

Then, the value of the first decimal place (0 in this case) of the calculated skew angle $\theta$ is defined as DP1 (Step S11), and it is judged whether DP1 is equal to or over 5 (Step S12). When DP1≧5 is satisfied, Se=10−DP1 is set (Step S13); when DP1 < 5 is satisfied, Se=DP1 is set (Step S14).

The calculated skew angle $\theta$ is rounded to the nearest whole number by counting 0.5 and over as a unit regarding to the value (DP1) in the first decimal place (Step S15).

Then, it is judged whether the count setting table corresponding to the calculated skew angle &H (&H=45° in this case) is initialized (Step S16).

In this case, since the table is initialized, the base count n=1, the clear count x=1, the combination count n=1, and the tolerance count Se=0 are set in correspondence with the table skew angle $\theta$ =45° (Step S17).

Then, the preset value of the clear count x is incremented by "1" (Step S18), and the procedure of Step and after is repeated.

When the clear count is set as x=2 and the procedure of Step S9 and after is repeated (in this case, $\theta$=45°, DP1=0 and Se=0), the process proceeds from Step S16 to Step S19, and n, m and Se set at Step S17 are set as variables bs, cb and ks (Step S19). Then, def1=|cb−bs| and def2=|m−n| are found (Step S20). In this case, since cb=bs=1 is satisfied, def1-=def2=0.

Then, it is judged which is larger, def1 or def2 (Step S21); if def1>def2 is not satisfied, it is judged whether def1=def2 and ks>Se (Step S22). In this case, since def1=2 and ks=Se=0, the process proceeds to Step S23. At Step S23, it is judged whether def2=1 and ks>Se. In this case, the judgment at Step 23 is negative (NO); the process proceeds to Step S18, and the clear count x is incremented by "1"; the procedure of Step S9 and after is repeated.

When it is judged at Step S21 def1 >def2 is satisfied, it is judged whether def1 ≠1 (Step S24); if the answer is NO, it is further judged whether ks ≧Se (Step S25). When the answer at Steps S22, S23, S24 or S25 is YES, the process proceeds to Step S17, and the preset values to $\theta$=45° in the table are changed. On the other hand, when both the answers at Steps S24 and S25 are NO, the process proceeds to Step S18, and the clear count X is further incremented by "1".

The processing routine at Steps S19 through S25 is a compensation processing routine which, in the case where x, n, m and Be corresponding to the skew angle $\theta$ have been found, preferentially chooses ones of the variables that has a difference between n and m as small as possible and sets them as count values.

The procedure previously mentioned is successively repeated; when the clear count x becomes the preset maximum value k or over (the answer is NO at Step S9), the combination count m is incremented by "1" (Step S26), and the procedure of Steps S7, S8, S9, S10 and so forth is repeated. When the combination count m becomes the preset maximum value j or over (the answer is NO at Step S7), the base count n is incremented by "1" (Step B27), and the procedure of Step S5 and after is repeated. When the base count n reaches the preset maximum value i at Step S5, the process is completed.

As a result of the completion of the process mentioned above, the skew angle $\theta$ is calculated from 45°, 44°, 43°, 42°, ..., up to 1°, and the count values corresponding to them are found. The obtained results of the operation are shown in Tables 1 and 2, as have been stated.

Figure 6:
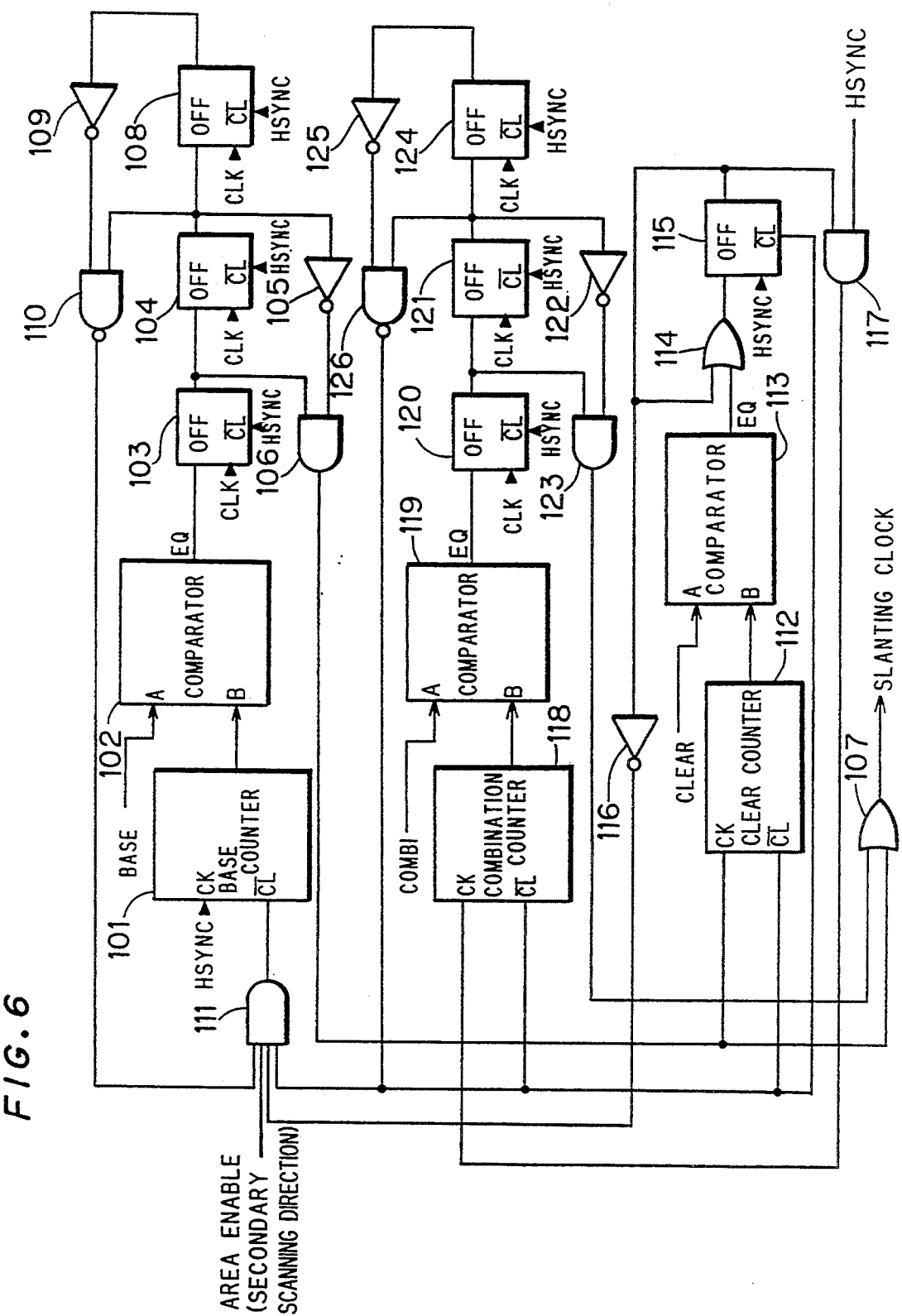
FIG. 6 is a circuit diagram showing an address shift clock generating circuit.

FIG. 6 shows a circuit included by the write/read control circuit 333 (see FIG. 3), for producing a skew processing type address shift clock based upon the base counter preset value n, the clear counter preset value x and the combination counter preset value m shown in Tables 1 and 2.

FIGS. 7A and 7B are timing charts showing the operation of the circuit in FIG. 6.

Referring to FIGS. 6, 7A and 7B, the address shift clock producing circuit can be divided into three sections: a base count type circuit in the upper stage, a combination count type circuit in the middle stage, and a clear count type circuit in the bottom stage.

When an area enable signal in a secondary scanning direction turns from low to high, a horizontal synchronization signal (HSYNC) is counted by a base counter 101. A count value of the base counter 101 is applied to a comparator 102 and compared with the preset value n for the base counter (the preset value n is loaded in the comparator based upon Tables 1 and 2). When the count value of the base counter 101 is identical with the preset value n, an EQ output of the comparator 102 turns high and is applied to a D flip flop 103. When the D flip flop 103 receives a clock under the condition that the EQ signal of high is being applied, an output of the D flip flop turns high. At this time, the next output of a D flip flop 104 is low; as it is inverted by an inverter 105 to turn high, a slanting clock is outputted through an AND gate 106 and an OR gate 107. Then, when the next clock is applied to the D flip flop 107, an output of the D flip flop turns high, the slanting clock turns low; an output of a NAND gate 110 turns low because of a high output which is a high output of the D flip flop 104 and a low output of a D flip flop 108 inverted by an inverter 109; a clear pulse is applied through an AND gate 111 to the base counter 101, and thus the base counter is cleared.

The slanting clock outputted by the AND gate 106 is applied to a clear counter 112 and counted. A count value of the clear counter 112 is compared with the clear counter preset value x (the preset value is also loaded based upon Table 1) by a comparator 113. When the count value of the clear counter 112 becomes the preset value x, an EQ output is drawn from the comparator 113 and applied through the OR gate 114 to a D flip flop 115. The D flip flop 115 under the condition that the EQ output of high is being applied has an output turned high when the horizontal synchronization signal turns low. Since the high output is returned through the OR gate to the D flip flop 115, the D flip flop is in self-holding. The high output of the D flip flop 115 is inverted to low by an inverter 116 and clears the base counter 101 through the AND gate 111.

Thus, a slanting clock is drawn by the base count circuit in the upper stage every preset value n of the base counter, and this is repeated until it reaches the preset value x of the clear counter by the clear count circuit in the bottom stage.

When the D flip flop 115 in the clear count circuit in the bottom stage under the condition that its output is high receives a horizontal synchronization signal, a count signal is applied through an AND gate 117 to a combination counter 118. The combination counter 118 counts the number of the applied horizontal synchronization signals and applies it to a comparator 119. From the comparator 119, an EQ output of high is drawn when a count value of the horizontal synchronization signal is identical with the preset value m set in advance (the preset value is also loaded based upon Tables 1 and 2). Then, the high EQ output is applied to a D flip flop 120. An output of the D flip flop 120 turns high in response to a clock input; since a low output of a D flip flop is inverted by an inverter 122, a slanting clock is outputted from an AND gate 123. Then, when the next clock is applied, an output of the D flip flop turns high; as an output of a D flip flop 124 is low, it is inverted to high by an inverter 125, a clear pulse is outputted from an NAND gate 126, and the whole circuit is cleared to the initial state.

Figure 8:
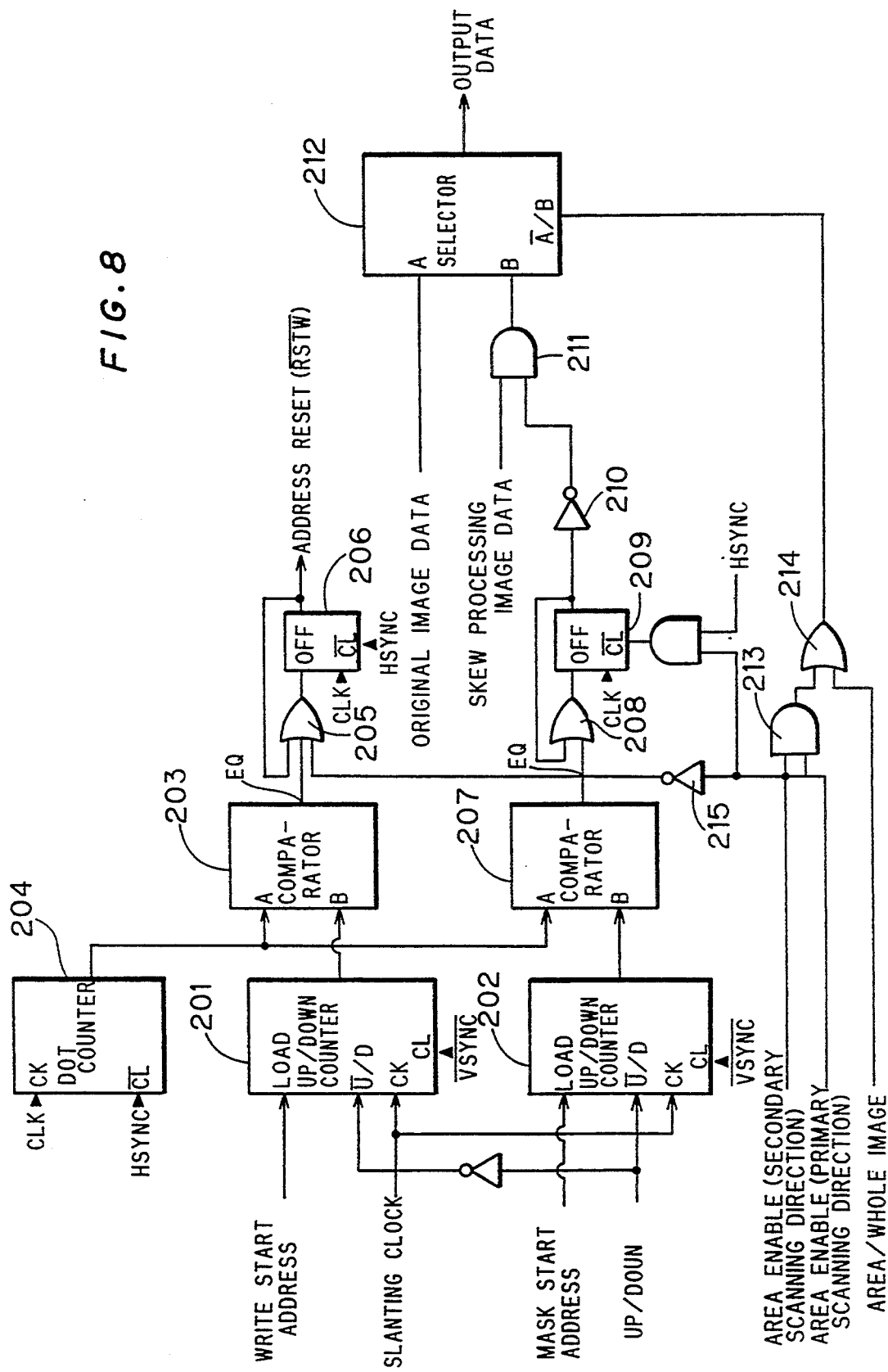
FIG. 8 is a circuit diagram showing an example of an address control signal generating circuit for the skew processing.

FIG. 8 is a circuit diagram of the skew processing type address control signal producing circuit. The circuit is included by the write/read control circuit 333 (see FIG. 3).

The circuit controls the write start address RH0 of the image data to the skew processing line buffer 331 (see FIG. 3) based upon the write start address previously explained and also shifts the write start address RH0 in accordance with a produced slanting clock. Furthermore, it masks the reading of the image data from the skew processing line buffer 331 by the mask start address MH0 previously explained and also shifts the mask master address MH0 by the slanting clock. Moreover, the circuit controls the selective reading of data from the original type line buffer 332 and the skew processing type line buffer 331.

Figure 9:
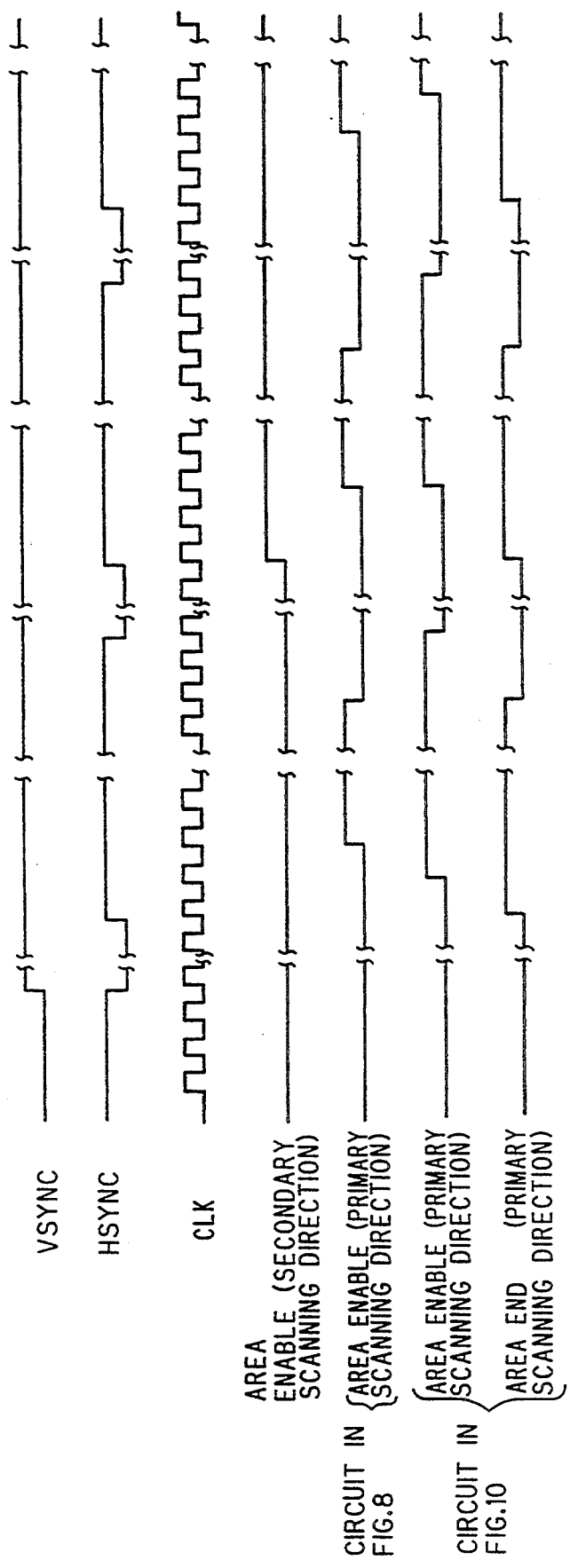
FIG. 9 is a timing chart expressing the operation of the address control signal generating circuit for the skew processing.

FIG. 9 is a timing chart of the circuit of FIG. 8. Now, with reference to FIG. 9, the circuit of FIG. 8 will be specifically explained.

In a write type up-down counter 201, the write start address RH0 is loaded. Also in a mask type up-down counter 202, the mask start address MH0 is loaded.

The write start address RH0 and the mask start address MH0, as previously described, satisfy RH0=(j1−j0)×tan $\theta$ and MH0=i 1−RH0 when the skew angle is in the positive direction, while they satisfy RH0=0, and MH0=i1 when the skew angle is in the negative direction.

In correspondence with the skew direction, up count or down count of the up-down counters 201, 202 are specified. More specifically, the write type up-down counter 201 is set for down count while the mask type up-down counter is set for up count when the skew angle is in the positive direction. In the case where the skew angle is in the negative direction, the write type up-down counter 201 is set for up count, while the mask type up-down counter 202 is set for down count.

In setting the write start address RH0, the mask start address, and their up/down, as has been described, an area to be processed into the skew, the skew angle and the skew direction are inputted from the tablet 9, so that a value obtained by an operation by the CPU 6 is automatically set.

The write type up-down counter 201, receiving a slanting clock, executes an up count or down count from an initial value of the loaded write start address RH0.

Then, the count value is applied to a comparator 203. In the comparator 203, the number of counted dots applied by the dot counter 204 is compared with a count number of the up-down counter 201 for every single line. As has been described, the slanting clock is a clock outputted each time the write start address RH0 has to be shifted; so receiving the slanting block, the count value of the up-down counter 201, or the write start address RH0, is shifted, and it is compared with a count value of the dot counter 204 by the comparator 203. Thus, when an address of image data to be written reaches the write start address RH0 for each single line, a high EQ output is drawn from the comparator 203 and applied through the OR gate 205 to the D flip flop 206. Also, the D flip flop 206 is self-held in response to a clock input and outputs an address reset signal (RSTW) of high. When the address reset signal turns high, a clock synchronization causes a writing address in the line to be incremented from "0". In other words, writing image data in a skew processing type line buffer 331 commences.

Since an area enable signal in the secondary scanning direction is inverted by an inverter 215 and applied to the OR gate 205, the D flip flop 206 always outputs a high address reset signal with regard to the outside of the area to be processed into the skew in the secondary scanning direction; therefore, the writing of the image data is never limited.

The mask start address MH0 loaded in the mask type up-down counter 202 is counted up or down by the slanting clock, and the count value is applied to the comparator 207. In the comparator 207, a count value of the dot counter 204 is compared with a count value of the up-down counter 202; when both the count values come to be identical with each other, that is, when the count value of the dot counter 204 which is an address of an image reaches the count value of the up-down counter 202 for every single line, an EQ output of high is drawn. The output is applied through the OR gate 208 to the D flip flop 209. Then, in response to a clock input, an output of the D flip flop 209 is self-held. Its high output is inverted by an inverter 210 and applied to an AND gate 211. Thus, when an address of the image data becomes the mask start address MH0, the skew processed image data outputted from the AND gate 211 comes not to be outputted, and the skew processed image data is masked.

In the case where an area enable signal in the secondary scanning direction is high, the D flip flop 209 is cleared by a horizontal synchronization signal and outputs a mask start signal for each single line.

Based upon the area enable signal (in the secondary and primary directions) or an area specification/the whole image specification switching signal, a selector 212 is switched. More specifically, when both the area enable signals in the secondary and primary directions are high, a high signal is applied through an AND gate 213 and an OR gate 214 to a switching terminal of the selector 212. Thus, the selector 212 selects the skew processed image data applied to a B terminal as an output data. On the other hand, when either the area enable signal in the secondary scanning direction or the area enable signal in the primary scanning direction is low, that is, when the outside of the skew processed area specified by the tablet 9 (see FIG. 1) is selected, a low signal is applied as a switching signal to the selector 212; hence, the original image data applied to the A terminal is selected as an output data.

This is also the case of an area selection/whole image selection signal.

In this way, in the area to be processed into the skew, since both the area enable signals in the primary and secondary scanning directions turn high, in such a case the skew processed image data is selected, otherwise the original image data is selected to be an output data.

Figure 10:
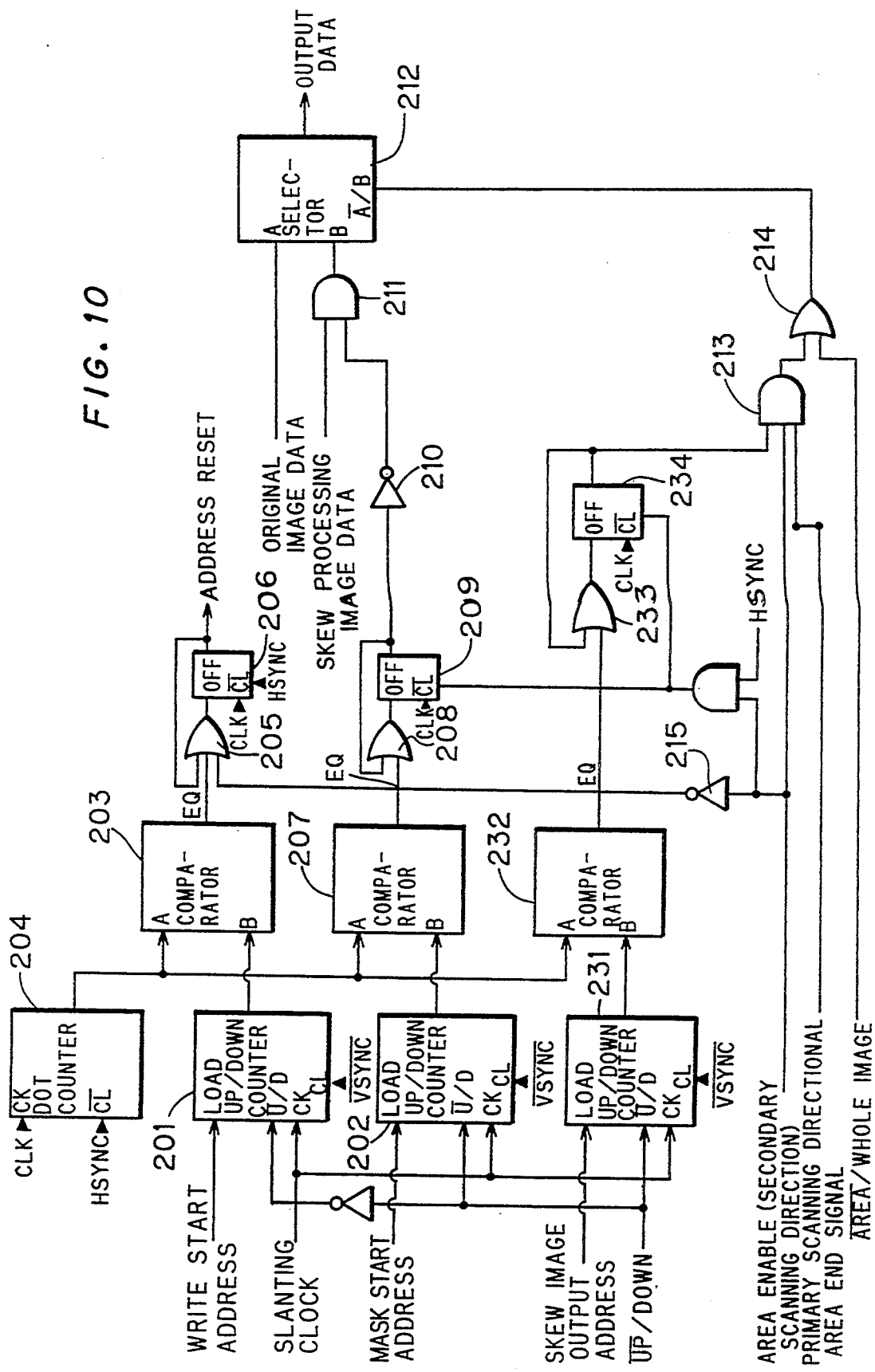
FIG. 10 is a circuit diagram showing another example of the address control signal generating circuit for the skew processing.

FIG. 10 is a circuit diagram showing a skew processing type address control circuit of another embodiment. The circuit is different from the circuit shown in FIG. 8 in that the skew processed image is preferentially outputted when the skew processed image overlaps with the original image. Therefore, this circuit is composed of the circuit shown in FIG. 8 and a skew image type up-down counter 231, a comparator 232, an OR gate 233 and a D flip flop 234 connected thereto. An operation timing of the circuit is shown in FIG. 9.

Like reference numerals denote corresponding parts to those of the circuit shown in FIG. 8.

A skew image output address is loaded into the skew image type up-down counter 231. The skew image output address is i0 −(j1 −j0) tan θ.

The skew image type up-down counter 231 is set so that it takes an up count when the skew angle is in the positive direction and takes a down count when it is in the negative direction.

In the comparator 232, a count value of the dot counter 204 is compared with a count value of the skew image type up-down counter 231; when the count value of the dot counter 204 is identical with the count value of the skew image type up-down counter 231, an EQ output of high is drawn, and the output is applied through the OR gate 233 to the D flip flop 234. The D flip flop 234 is self-held in response to a clock input, while its high output is applied through an AND gate and an OR gate to the selector 212 as a select signal, and skew processing image data is selected.

Also, in this case, when an area end signal in the primary scanning direction is applied, the AND gate 213 turns to the low level, and the selector 212 selectively outputs an original image data.

Figure 11:
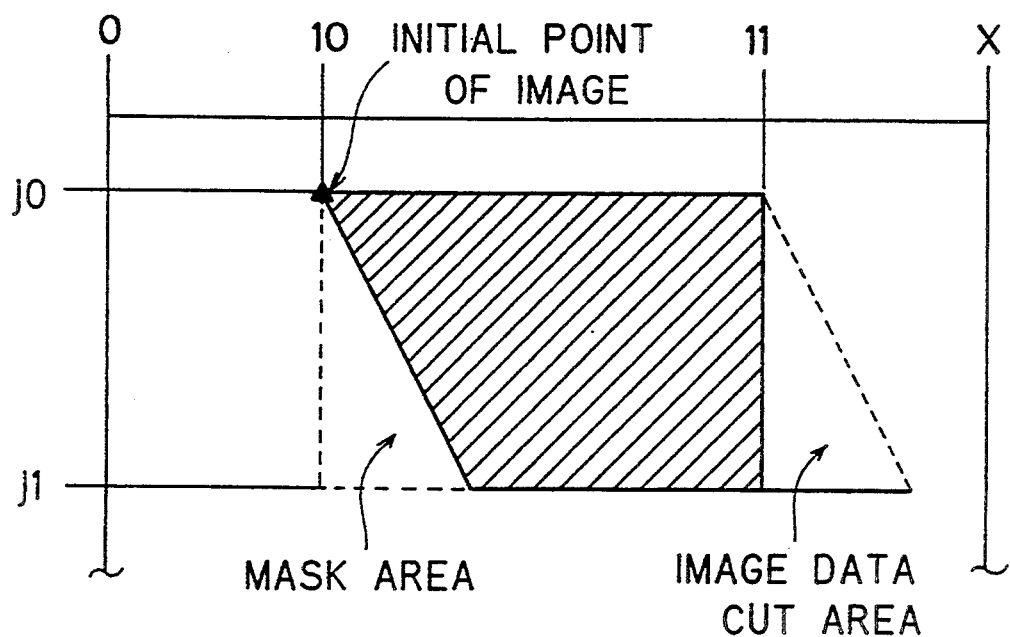
FIGS. 11 and 12 are diagrams for showing a sample case in which an effective area varies depending upon an initial point in a specified area of an image to be processed into the skew.

Referring back to the circuit in FIG. 8, in the case where the original image data is preferentially output, when a rectangular area to be processed into the skew is set, an initial point of the image is automatically set, as shown in FIG. 11 and a cut area and a mask area of the skew processed image are automatically defined.

Figure 12:
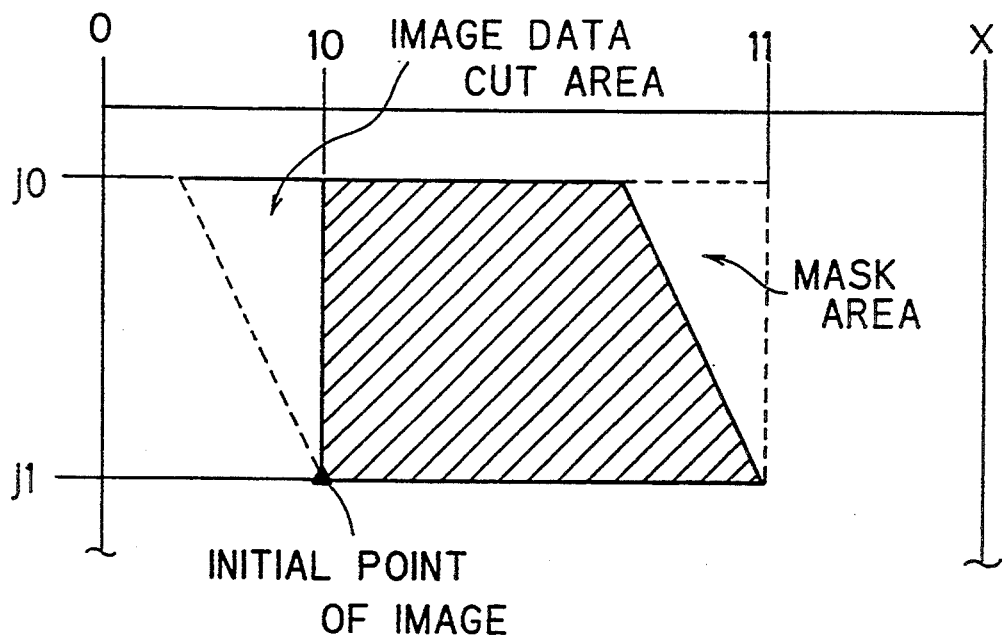

However, when the initial point of the image is changed, e.g., when the initial point of the image is set as shown in FIG. 12, the cut area and mask area of the skew processed image are changed.

Then, as still another embodiment of the present invention, when an area to be processed into the skew is set, an initial point of the image is also set (the setting can be performed by specifying an arbitrary point in the skew processed area on a tablet), so that an effective area of the skew processed image is attained as a desired one, and the desired area can be processed into the skew.

Figure 13:
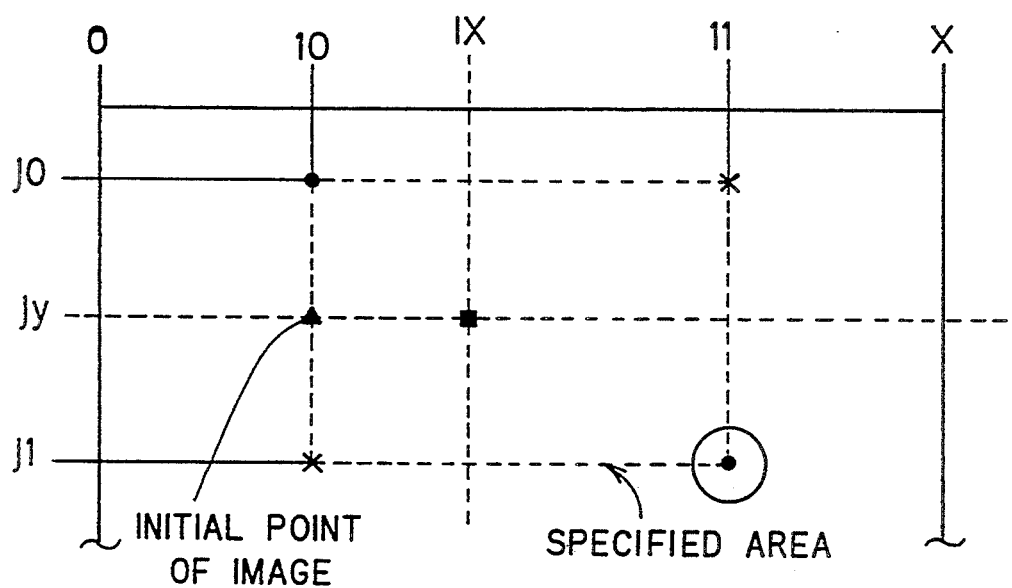
FIG. 13 is a diagram for explaining a way of specifying the initial point of the image in this embodiment.

First, as shown in FIG. 13, the area to be processed into the skew is specified. For example, two points like (i0, j0) (i1, j1) or (i1, j0) (i0, j1) are specified, and the area to be processed into the skew is specified. Then, as the initial point of the image, specifying an arbitrary point in a range of (ix): x=0 to X in the primary direction and another arbitrary point in a range of (jy): y=j0 to j1 in the secondary scanning direction, the initial point of the image is specified.

Figure 14:
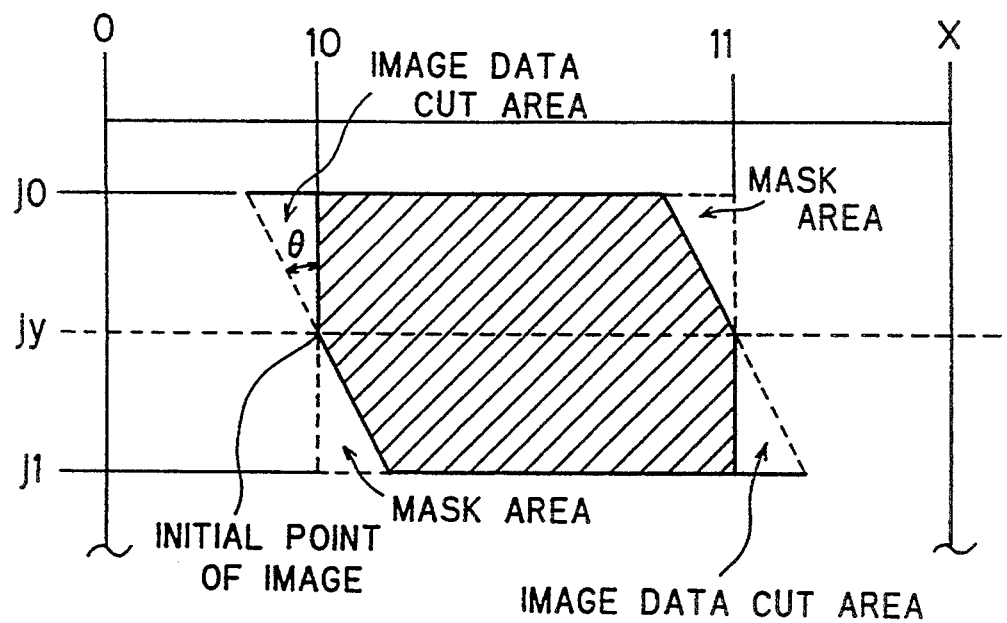
FIG. 14 is a diagram for explaining an effective area of the image to be processed into the skew in the case where the initial point of the image is specified in conjunction with FIG. 13.

As a result, as shown in FIG. 14, the skew processed image can be attained as a desired image.

With the previous statements, the embodiments in which an arbitrary area in an original image can be copied as a skew processed image are discussed; however, the arbitrary area for the skew processed image may be more than a single area. This means that, in the case of specifying an area to be processed into the skew, a plurality of different areas can be specified in the secondary scanning direction as areas to be processed into the skew. Additionally, it is also possible, in the case where a plurality of areas to be processed into the skew are specified, that the skew angle and skew direction is changed for each of the specified areas, and the contents processed into the skew are individually set.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A skew processing circuit for performing skew processing for an original image to thereby provide skew-processed image data, said circuit comprising:
   means for generating a signal which specifies an area to be processed as a partial skew image, wherein the area to be processed as the partial skew image is less than the area of the original image;
   skew processing means for processing data indicative of the partial skew image based upon said signal which specifies the area to be processed, to thereby provide the skew-processed image;
   selective outputting means for selectively outputting one of the skew-processed image and the original image, wherein said selective outputting means includes output means for preferentially outputting the original image when the skew-processed image and the original image overlap with each other; and
   mask means for masking an area vacant of data caused by the processing of the original image into the skew-processed image by said skew processing means.

2. A skew processing circuit for performing skew processing for an original image to thereby provide skew-processed image data, said circuit comprising:
   means for generating a signal which specifies an area to be processed as a partial skew image, wherein the area to be processed as the partial skew image is less than the area of the original image;
   skew processing means for processing data indicative of the partial skew image based upon said signal which specifies the area to be processed, to thereby provide the skew-processed image;
   selective outputting means for selectively outputting one of the skew-processed image and the original image, wherein said selective outputting means includes output means for preferentially outputting the skew-processed image when the skew-processed image and the original image overlap with each other; and
   mask means for masking an area vacant of data caused by the processing of the original image into the skew-processed image by said skew processing means. count means, said base clear count means and said combination count means.

3. A skew processing circuit for making a skew-processed image slanted at a specified angle by processing an original image composed of a plurality of lines of data, comprising:
   base count means for storing a preset base count value and providing a count representing a number of lines of inputted image data which are applied to shift a processing address corresponding to the specified angle;
   base clear count means for storing a preset base clear count value and providing a count representing a number of times a shift is repeated based upon said preset base count value;
   combination count means for storing a preset combination count value and providing a count representing a number of lines of further inputted image data which are applied after the shift of the processing address by said base count means to shift the processing address; and
   address shift means for shifting the processing address based upon said preset values of said base count means, said base clear count means and said combination count means.

4. A skew processing circuit as claimed in claim 3, wherein:

$$\theta = \tan^{-1} \frac{x+1}{nx+m}$$

wherein:
   Θ represents said specified angle,
   n represents said preset base count value;
   x represents said preset base clear count value; and
   m represents said preset combination count value.

* * * * *